United States Patent [19]

Gurley et al.

[11] Patent Number: 5,043,639
[45] Date of Patent: Aug. 27, 1991

[54] VIDEO DISPLAY APPARATUS WITH KINESCOPE SPOT BURN PROTECTION CIRCUIT

[75] Inventors: Thomas D. Gurley; Leroy S. Wignot, both of Indianapolis, Ind.

[73] Assignee: Thomson Consumer Electronics, Inc., Indianapolis, Ind.

[21] Appl. No.: 515,512

[22] Filed: Apr. 30, 1990

[51] Int. Cl.$^5$ .................................. H01J 29/52
[52] U.S. Cl. .................................. 315/386; 358/220
[58] Field of Search ................. 315/384, 386; 358/220

[56] References Cited

U.S. PATENT DOCUMENTS

| | | | |
|---|---|---|---|
| 3,946,275 | 3/1976 | Marino | 315/383 |
| 4,340,910 | 7/1982 | Valdes | 358/243 |
| 4,387,405 | 6/1983 | Hinn | 358/243 |
| 4,488,181 | 12/1984 | Haferl | 358/220 |
| 4,660,093 | 4/1987 | Craig et al. | 358/243 |

Primary Examiner—Theodore M. Blum
Attorney, Agent, or Firm—Joseph S. Tripoli; Peter M. Emanuel; Richard G. Coalter

[57] ABSTRACT

A television receiver includes a kinescope spot burn protection circuit comprising a capacitor coupled between a source of blanking signal and a control grid of the kinescope for applying negative grid cut-off bias to the kinescope in response to the blanking signal. The amplifier is of the cascode type having a minimum output voltage for peak white levels of a video signal applied to the cathode. The protection circuit includes a potential divider for biasing the kinescope at a positive voltage level related to the minimum output voltage of the amplifier during normal operation of the receiver to maximize the brightness of displayed images. The protection circuit also includes a breakdown device in the potential divider for limiting the maximum grid bias voltage to a level less than the minimum output level of the amplifier but greater than the positive voltage level provided by the potential divider to thereby avoid forward biasing the grid of the kinescope upon termination of the blanking signal which otherwise could occur during recharging of the capacitor.

14 Claims, 2 Drawing Sheets

VIDEO DISPLAY APPARATUS WITH KINESCOPE SPOT BURN PROTECTION CIRCUIT

FIELD OF THE INVENTION

This invention relates to television display apparatus and particularly to protection circuitry for such apparatus for preventing spot burn of the display kinescope under conditions of scan loss.

BACKGROUND OF THE INVENTION

Direct-view and projection display systems conventionally employ kinescopes as display devices. In normal operation of a kinescope an electron beam is deflected by scanning circuitry to produce a relatively large area raster on the face plate of the kinescope and video modulation of the beam produces a visible picture by activating phosphors deposited on the face plate. The beam energy in normal operation is distributed over the whole area of the kinescope face plate. If scan loss should occur, this energy may be concentrated to a relatively small area and this high concentration of energy may produce permanent damage to the phosphor, a so-called "spot burn". Scan loss may occur during turn-on under so-called "hot start" conditions, it may also occur during turn-off and it may also occur during normal operation of the display due, for example, to a component failure.

It is generally known to protect against scan loss by detecting or "predicting" the scan loss occurrence and in response to the detected or predicted occurrence applying grid-to-cathode bias to the kinescope of a value sufficient to blank or cut-off the electron beam. Three examples of beam cut-off for spot-burn protection are discussed below.

In a first example of beam cut-off for spot burn protection, the beam cut-off is provided by driving the kinescope cathode driver amplifier to its maximum positive output voltage corresponding to peak black level ("blacker than black"). This technique is exemplified by U.S. Pat. No. 4,660,093 entitled TELEVISION RECIEVER WITH DELAYED DISPLAY which issued to Craig et al. on Apr. 21, 1987. In this example a control circuit is included for inhibiting the operation of the kinescope driver stages for a short interval after the receiver is energized, particularly under "hot start" conditions, to prevent disturbing artifacts from being displayed by the kinescope. The circuit drives the kinescope cathodes to cut-off ("blacker than black" level) by clamping the base of the output transistor of a cascode driver amplifier to ground.

In a second example of spot burn protection, beam cut-off is provided by driving the control grid negative relative to its normal bias value. This techniques is exemplified by U.S. Pat. No. 4,340,910 entitled CRT SPOT SUPPRESSION CIRCUIT which issued to Valdes on 20 July 1982. In this circuit, a scan indicating signal is applied via a parallel resistor and capacitor to the anode of a PN diode and to the control grid of the kinescope. The cathode of the diode is grounded. In operation, the scan indicating signal charges the capacitor and a portion of the signal flows through the resistor to develop a grid bias voltage across the diode of about 0.6 volts. Upon scan loss the reduction in scan indicating voltage is coupled via the charged capacitor to the diode thereby reverse biasing the diode and driving the kinescope grid negative to achieve grid cut-off thereby cutting off the electron beam of the kinescope.

In a third example of spot burn protection, scan loss is predicted and the control grid is driven negative prior to the actual occurrence of scan loss. This protection technique is exemplified by U.S. Pat. No. 4,488,181 entitled ELECTRON BEAM SUPPRESSION CIRCUIT FOR A TELEVISION RECEIVER which issued to Haferl on Dec. 11, 1984. In this example, a remote control circuit develops an on/off command signal for switching between normal and standby modes of operation. A first switch is responsive to the command signal and disables normal generation of the scanning current upon the occurrence of the off-state of the command signal to inhibit normal sweep of the electron beam. A second switch, also responsive to the command signal, applies to one of the electrodes of the picture tube, such as the grid electrode, a blocking potential upon the occurrence of the off-state of the command signal to suppress generation of the electron beam prior to the disablement of the scanning current generation. In a specific embodiment of the invention, the blocking potential is provided by a circuit comprising a capacitor having a first plate connected to a charging source and having a second plate connected to the kinescope grid and coupled to ground via a PN diode. In normal operation the capacitor is charged by the charging source and a resistor in parallel with the capacitor applies forward bias to the diode thereby establishing a grid bias voltage for the kinescope of about 0.6 volts. Grid blocking is provided by a clamp transistor which clamps the first plate of the capacitor to ground in response to the turn-off command thereby reverse biasing the diode and driving the grid to a negative potential.

SUMMARY OF THE INVENTION

It would appear that one could obtain the benefits of both cathode driver beam cut-off and grid blocking beam cut-off by simply combining the first example of driver blocking discussed above with either one of the second and third examples of grid blocking discussed above. It has been discovered, however, that certain problems arise in achieving a workable combination for the specific case where the kinescope driver is of the cascode type as in the first example discussed. On a more fundamental plane, it has been discovered that the known grid blocking circuits described above are not well suited for use with cathode driver amplifiers of the cascode type generally, whether or not such amplifiers include provisions for providing beam cut-off.

In more detail, it has been disco·ered that a significant loss of peak brightness and overall visual dynamic range can occur in video display apparatus in which spot burn protection is applied to the grid of a kinescope as described in examples two or three above for the specific case where the kinescope cathode is driven by a driver amplifier of the cascode type. The reasons for these deficiencies have been discovered to be related to biasing of the grid circuit of the kinescope relative to operating voltage range of the cascode driver amplifier and are discussed in more detail hereinafter.

The present invention is directed to meeting the need for a display apparatus in which kinescope spot burn protection is provided by a "charge pump" technique to the kinescope grid electrode and which enables the use of a cascode-type kinescope driver amplifier without loss in overall dynamic range or peak brightness of images displayed by the kinescope.

Video display apparatus embodying the invention comprises a kinescope having a cathode coupled to an output of a video amplifier and having a control grid coupled to an output of a protection network of a type including a capacitor having a first electrode coupled to a source beam blanking signal and having a second electrode coupled to the control grid for applying a negative cut-off bias thereto in response to the occurrence of the beam blanking signal.

In accordance with the invention, the protection circuit further includes a potential divider having an output coupled to the second electrode of the capacitor for applying a positive bias voltage of a given value to the grid in the absence of the beam blanking signal, the given value being less than a minimum output voltage produced by the video amplifier. A breakdown device in the potential divider, responsive to termination of the beam blanking signal, limits the maximum positive grid bias voltage of the kinescope to a value that is greater than the given value determined by the potential divider and which is less than the minimum positive output voltage produced by the video amplifier.

BRIEF DESCRIPTION OF THE DRAWING

The foregoing and further features of the invention are illustrated in the accompanying drawing wherein like elements are denoted by like reference designators and in which.

DETAILED DESCRIPTION

Figure 1:
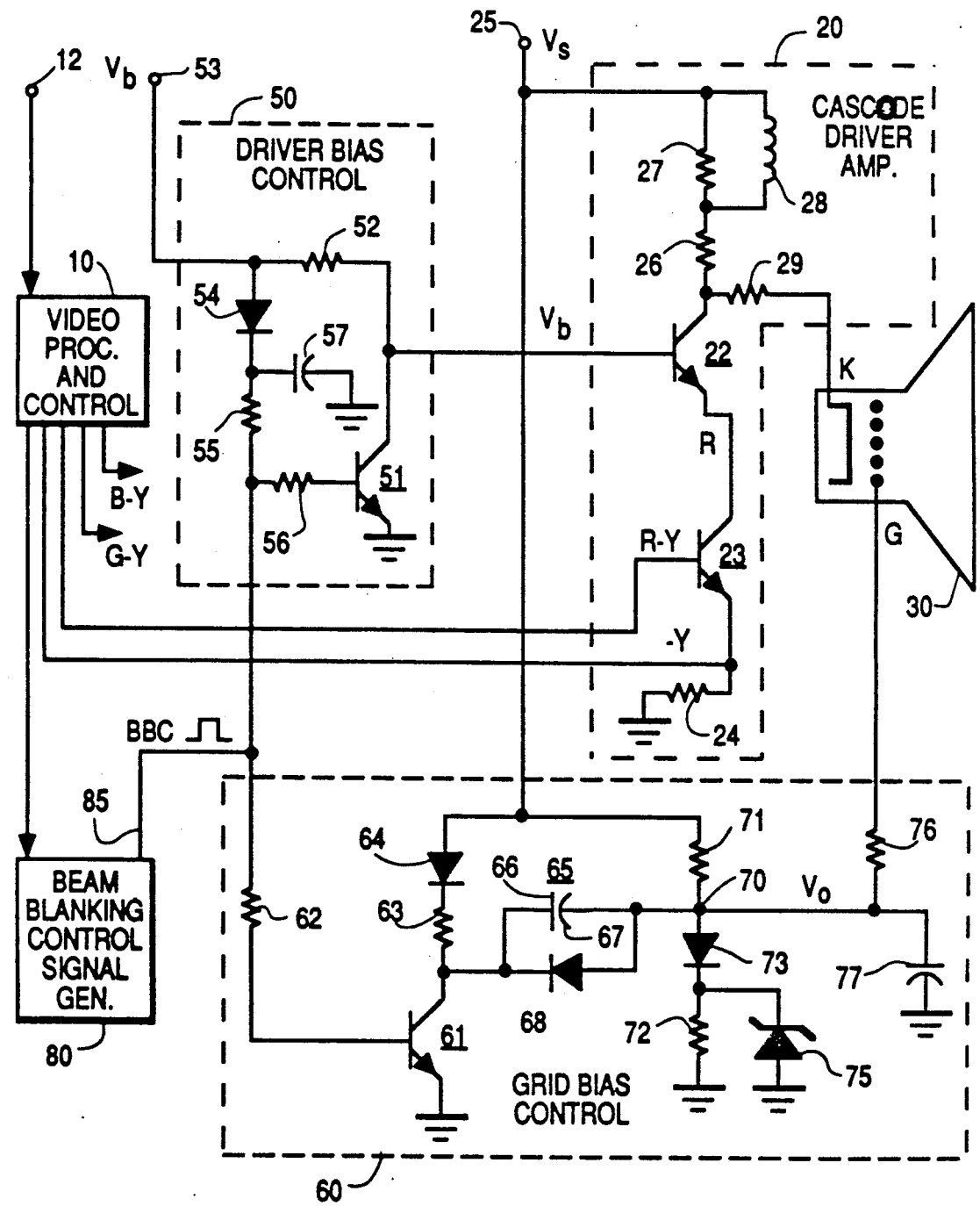
FIG. 1 is a simplified block diagram, partially in schematic form, of a color television receiver including a video display system embodying the invention.

The television receiver of FIG. 1 includes a video processing and control unit 10 having an input 12 for receiving a video input signal from a tuner or other suitable source and having an output providing processed video output signals that are coupled via a driver amplifier 20 (outlined in phantom) to the cathode K of a kinescope 30 for display. Operating bias (e.g., 12 volts) for the base electrode of the output transistor 22 in amplifier 20 is provided by a driver bias control unit 50 (outlined in phantom). Grid bias for the grid G of kinescope 30 is provided by a grid bias control unit 60 (outlined in phantom). The driver amplifier bias and the kinescope grid bias are controlled by units 50 and 60 in response to a beam blanking control signal BBC produced by a beam blanking control signal generator 80 that is coupled to the video processing and control unit 10

To simplify the drawing, kinescope 30 is illustrated as having a single cathode. For display of color images in a direct view receiver or monitor, it will be appreciated that kinescope 30 would be provided with three cathodes and there would be three separate cathode driver amplifiers, one for each cathode. For display of color images in a projection type receiver or monitor there would be three kinescopes (one for each primary color) and three associated kinescope driver amplifiers. For either direct view or projection applications there would be a separate driver amplifier bias control unit and a separate grid bias control network for each respective cathode and grid.

Processing unit 10 may be of conventional design and includes, illustratively, circuits for tuning, detection, IF amplification and luminance and chrominance processing circuitry. Unit 10 also includes power supply and control circuits, sound processing circuits and scanning circuitry for deflecting an electron beam, emitted by the cathode K, across the faceplate 32 of kinescope 30 for producing a raster during normal operation of the receiver.

Amplifier 20 provides the function of amplifying the processed video signal provided by unit 10 to voltage levels suitable for driving the cathode K of kinescope 30 and is of the cascode type having input (23) and output (22) transistors connected in cascode. An important advantage of using a cascode amplifier as a video driver is that such amplifiers only require a single high-voltage output transistor as compared, for example, with complementary push-pull amplifiers that require at least one pair of high voltage output transistors. A further advantage is that cascode amplifiers are relative immune to the so-called "Miller effect" and so provide exceptionally good high frequency response.

In more detail, in amplifier 20 the input transistor 23 has an emitter electrode coupled to ground by an emitter resistor 24 and coupled to unit 10 for receiving a luminance input signal (Y) from unit 10. The base of transistor 23 is also coupled to unit 10 for receiving a color difference signal R-Y. With these signal connections the input transistor 23 provides a color matrixing function (in addition to amplification) whereby the collector current produced corresponds to a red (R) drive signal. The collector current of the input transistor 23 is applied to the emitter of output transistor 22 which receives a DC bias voltage Vb at its base electrode (e.g., 12 volts during normal operation) that is provided by driver bias control unit 50. The collector of output transistor 22 is coupled via a load to a source (supply terminal 25) of high voltage Vs (e.g., nominally 200 volts or so). The load comprises a pair of resistors 26, 27 connected in series between the collector of transistor 22 and supply terminal 25. Peaking is provided by an inductor 28 connected in parallel with resistor 27. The amplified red drive signal appearing at the collector of output transistor 22 is coupled via a arc protection resistor 29 to the cathode K of kinescope 30.

Spot burn protection for kinescope 30 is provided by beam blanking control signal generator 80 which generates a beam blanking control signal BBC for the driver bias control unit 50 and the grid bias control unit 60. Blanking control signal generators suitable for this purpose are generally well known and examples of generators suitable for this purpose are given in the previously discussed patents of Craig et al. and Haferl. What is important to the present invention is that some suitable form of blanking control signal be provided for suppressing the electron beam of kinescope 30 under conditions which otherwise might damage the kinescope or which might create unwanted visual artifacts (e.g., random color flashes during turn-off of the display). Examples of suitable blanking generators include the following: (1) a power-up detector which generates a momentary blanking signal upon turn-on of the receiver (e.g., as in the Craig et al. patent), (2) a power-down detector which generates a blanking signal upon turn-off of the receiver and, preferably, just prior to disablement of the receiver scanning circuits (e.g., as in the Haferl patent); (3) a scan loss detector which generates a blanking signal upon detection of loss of vertical and or horizontal scanning signals; and (4) a yoke interlock circuit which generates a blanking signal upon unplugging the kinescope yoke from the receiver scanning circuits.

Beam blanking generator 80 may include one or more of the foregoing detectors or some other suitable form of detector or generator.

The function of driver bias control unit 50 is to provide DC bias for the output transistor 22 of amplifier 20 under normal operating conditions and to provide a cut-off bias under blanking conditions. The cut off bias renders the conduction path of output transistor 22 non-conductive and therefore the amplifier output voltage assumes a high positive value approximately equal to the high voltage supply (Vs). This condition biases the cathode K of kinescope 30 at a blacker-than-black level and effectively cuts off beam current flow in the kinescope. The specific circuit example shown providing these functions includes a common emitter connected transistor 51 having a collector electrode connected to the base of transistor 22 and connected via a collector load resistor 52 to a supply terminal 53 to which a bias voltage Vb (e.g., 12 volts) is applied. Terminal 53 is coupled via a diode 54, and two resistors 55, 56 to the base of transistor 51. A bypass capacitor 57 is coupled from the cathode of diode 54 to ground. The blanking control signal BBC is applied to the common connection of resistors 55 and 56. In operation the blanking control signal is normally low thereby biasing transistor 51 off and enabling base bias to be applied to transistor 22 in amplifier 20 by means of resistor 52 from supply terminal 53. Under blanking conditions, the output of generator 80 is essentially an open circuit and turn-on bias for transistor 51 is supplied to its base electrode via diode 54 and resistors 55 and 56. Under this condition transistor 51 clamps the base of transistor 22 to ground thereby cutting transistor 22 off and driving the cathode of kinescope 30 to a blacker-than-black voltage level.

The grid bias control unit 60 provides functions which include biasing the grid G of kinescope 30 at a positive voltage level during normal operation and applying a negative grid cut-off bias to the grid under blanking conditions. Provisions for maximizing the brightness of displayed images are provided by selecting the positive grid bias with respect to certain parameters of the minimum output voltage at peak white level of the cascode amplifier. Also, provisions are made for protection of the kinescope from the possibility for forward biasing the grid-cathode electrodes during a recovery period following termination of the beam blanking control signal.

In more detail, grid bias control unit includes a common emitter connected input transistor 61 having a base electrode coupled via an input current limiting resistor 62 to conductor 85 for receiving the beam blanking control signal BBC. During normal operation (BBC not present) an output transistor in unit 80 clamps conductor 85 to ground thereby turning transistor 61 off. When blanking is desired the output transistor of unit 80 turns off and conductor 85 is pulled to a positive potential by means of current provided by diode 54 and resistor 55 coupled to supply terminal 53. Accordingly, transistor 61 is turned on by current supplied by input resistor 62 when beam blanking control signal BBC is present.

The collector of transistor 61 is coupled via a series connected resistor 63 and diode 64 to the high voltage supply terminal 25 to which the supply voltage Vs (e.g., 200 volts) is applied. The collector of transistor 61 is also connected to the first plate (66) of a capacitor 65 having a second plate 67 thereof connected to a circuit node 70. A diode 68 is connected in parallel with capacitor 65 with the anode thereof being connected to circuit node 70 and the cathode thereof being connected to the collector of transistor 61.

Circuit node 70 corresponds to the output of a potential divider comprising a first resistor 71 coupled between node 70 and the positive supply terminal 25 for cascode driver amplifier 20 and a second resistor 72 coupled to ground at one end thereof and coupled at the other end thereof via the cathode-anode path of a diode 73 to node 70. A breakdown device 75 (e.g., a Zener diode) is connected in parallel with the second resistor 72 of the potential divider 71-72. The output 70 of the potential divider is coupled via a resistor 76 to the grid electrode G of kinescope 30 and via a bypass capacitor 77 to ground.

In normal operation of the receiver of FIG. 1 transistor 61 of grid bias control unit 60 and is biased OFF by beam blanking control signal BBC as previously explained. Under this condition capacitor 65 receives charging current from resistor 63 and charges to a potential equal to the supply voltage Vs minus the potential at the output (node 70) of the potential divider. The values of resistors 71 and 72 in potential divider are selected to provide a specific output voltage Vo at circuit node 70 that is less than the minimum output voltage Vom of driver amplifier 20 but great enough to ensure that maximum brightness can be produced by kinescope 30 when the cathode K is driven to a peak white level.

Selection of the potential divider output voltage has a significant influence on the peak brightness of displayed images as will now be explained. Recall that driver amplifier 20 employs a cascode type output stage. The minimum output voltage of this amplifier, at the cathode K of kinescope 30, is given approximately by the relationship:

$$Vom = Vbias + Vsat + Vkr$$

wherein Vbias is the voltage applied to the base electrode of the output transistor, Vsat is the saturation voltage of the output transistor 22 and Vkr is the voltage drop across the cathode resistor 29. For the illustrated example shown, Vbias is 12 volts, Vsat is about 15 volts and Vkr is about 10 volts (at peak white drive). The sum of these voltages, for the example shown, is 37 volts.

Since the brightness of a kinescope is inversely related to the cathode-to-grid voltage, maximum brightness is achieved by biasing the grid at a voltage which minimizes the grid-cathode potential difference without driving the grid positive relative to the cathode. If one were to bias the grid at or near ground potential, as in the prior art circuits previously discussed, then the brightness of the image would be poor because the minimum grid-cathode voltage would be substantially equal to Vom or about −37 volts. The purpose of the potential divider 71/72 is to reduce the grid-cathode voltage at peak white while maintaining a safe margin of voltage difference to ensure that the grid is not driven positive relative to the cathode as might occur, for example, due to component or power supply variations. Adverse effects due to supply variations are compensated for by connecting the potential divider across the same power supply to which the driver amplifier is connected. In the specific circuit shown and the assumed value of Vom, the potential divider resistors are selected to provide an output voltage of about 25 volts.

This is 10 volts less than the minimum amplifier output voltage delivered to the cathode K of kinescope 30 and provides a sufficient margin for component variations while providing the capability of maximum brightness of images when amplifier 20 is driven to a peak white level.

Figure 2:
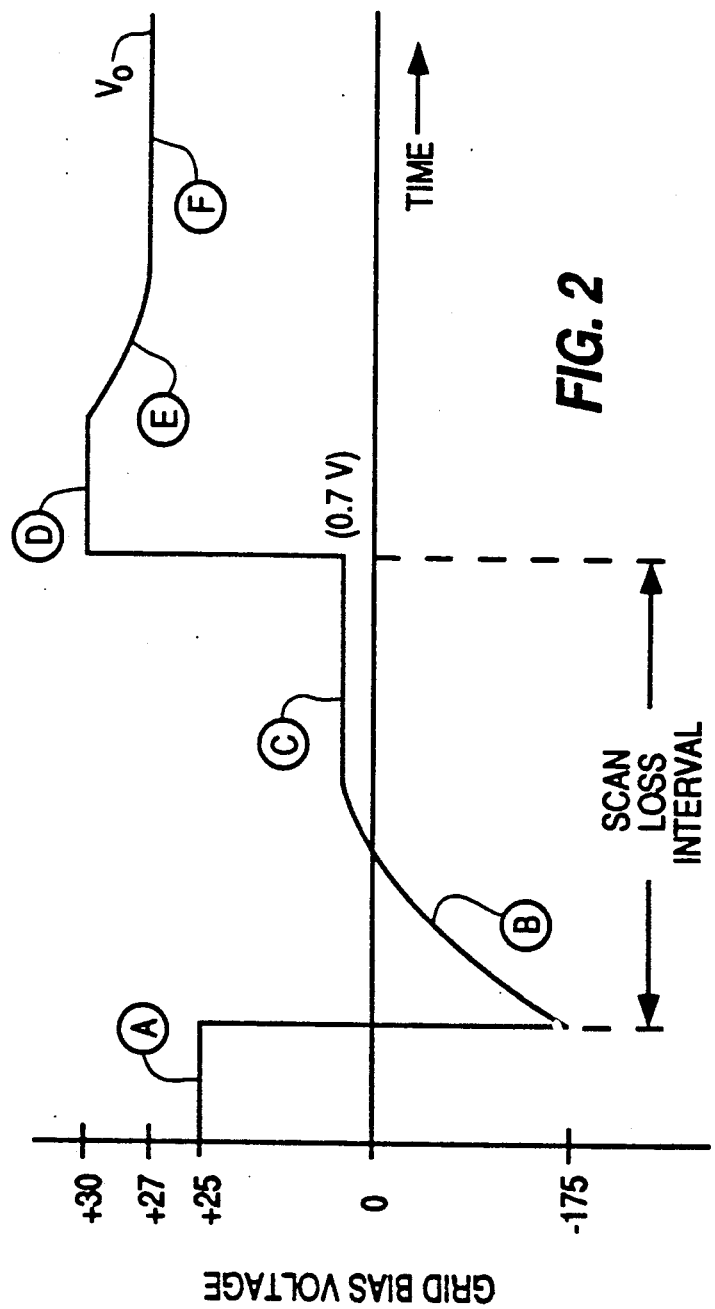
FIG. 2 is a waveform diagram illustrating operation of a grid bias control network in the receiver of FIG. 1.

FIG. 2 illustrates operation of the grid bias control unit 60 as a function of time. The waveform (not to scale) illustrates the value of the grid bias voltage, Vo, for various operating conditions. The region "A" corresponds to the output voltage during normal operation of the receiver as described above. When scan loss occurs transistor 61 turns on thus clamping the first plate 66 of capacitor 65 to ground. Recall that capacitor 65 was charged during the normal operating interval "A" to a potential equal to the supply voltage Vs (200 volts)-minus the potential divider output voltage (25 volts). Accordingly, when the first plate of capacitor 65 is clamped to ground in response to the beam blanking control signal BBC, the second plate 67 is driven negative to a potential of 175 volts. This potential is applied to the grid G of kinescope 30 and provides negative grid cut-off thereby protecting the kinescope from spot burn. Under this condition it will be noted that diode 73 in the potential divider is reverse biased. As a consequence, the resistor 72 and Zener diode 75 are both isolated from capacitor 65 and the only discharge path for the capacitor is provided by resistor 71. This resistor slowly discharges the capacitor 65 as shown in the region "B" in FIG. 2. It will be noted that if diode 73 were not present then diode 75 would be forward biased and would rapidly discharge capacitor 65. This would be undersirable since shortened the period of beam cut-off protection provided by capacitor 65. Diode 73, in other words, maximizes the discharge time constant of capacitor 65 and thus maximizes the period of grid cut-off bias protection.

As shown in FIG. 2 the discharge of capacitor 65 continues in region "B" until a point is reached when the output voltage is clamped to a small positive value (about 0.7 volts). This results because diode 68 turns on when the voltage on the second plate exceeds that of the first plate by its threshold voltage and the first plate 66 is clamped to ground. This is an important feature of the invention in that it ensures that no significant reverse voltage will be developed across capacitor 65. One may thus use a polarized capacitor for this application without danger of dielectric failure due to reverse polarization potential being applied to the capacitor.

At the end of the scan loss interval ("B" to "C") when the blanking control signal BBC terminates, transistor 61 will be turned OFF. Since capacitor 65 is in a discharged state the output voltage Vo of potential divider 71/72 will tend to increase immediately as charging current flows to capacitor 65 from supply Vs via resistor 63. If not corrected for, this voltage increase could possibly forward bias the grid G of kinescope 30 which could cause excessive beam current to flow. This possibility is prevented by breakdown diode 75 which limits the maximum potential divider output voltage to a value (e.g., 27 volts) which is slightly more positive than the potential divider output voltage but which is less than the minimum output voltage Vom of amplifier 20. This limiting effect takes place in region "D" of FIG. 2 until such time that capacitor 65 nears its final charge potential. Diode 75 then turns off (region "E") as capacitor 65 completes charging to the final normal operating voltage (region "F") which equals Vs−Vo and in which Vo is determined by the potential divider resistors 71, 72 and the value of high voltage supply Vs.

It will be noted in the foregoing description of the receiver of FIG. 1 that beam cut-off is provided both by driver bias control 50 which provides cathode cut-off and by grid bias control 60 which provides grid bias cut-off. This redundancy is desirable in that it guards against failure of either of the cut-off circuits. In a specific application where such redundancy is not needed one may dispense with the driver bias control unit 50 or replace this unit with another form of protection circuit. The present invention is primarily concerned providing grid bias cut-off of kinescope beam current in receivers of the type employing cascode type vide output driver stages as hereinbefore described.

What is claimed is:

1. Video display apparatus, comprising:
   a kinescope having a cathode coupled to an output of a video amplifier and having a control grid coupled to an output of a protection circuit including a capacitor having a first electrode coupled to a source of beam blanking control signal and a second electrode coupled to said control grid of said kinescope:
   said protection circuit further includes a potential divider having an output coupled to said second electrode of said capacitor for applying a positive bias voltage of a given value to said grid in the absence of said beam blanking signal, said given value being less than a minimum output voltage produced by said amplifier;
   a breakdown device in said potential divider for limiting the maximum positive grid bias voltage of said kinescope to a value that is greater than said given value determined by said potential divider and which is less than said minimum positive output voltage produced by said amplifier and wherein;
   said protection circuit includes an input transistor responsive to the presence of said beam blanking control signal for clamping said first plate of said capacitor to a point of ground potential; and
   said protection circuit includes a diode connected in parallel with said capacitor and poled in a sense to limit the maximum positive voltage at said second plate and at said control grid to substantially ground potential when said blanking signal is present for a period of time that is long relative to a time constant associated with said capacitor.

2. Video display apparatus as recited in claim 1, wherein:
   said potential divider comprises a first resistor coupled between a supply voltage terminal and said second electrode of said capacitor and a second resistor coupled between said second electrode of said capacitor and a point of reference potential; and
   said breakdown device is connected in parallel with said second resistor.

3. Video display apparatus as recited in claim 1 wherein:
   said potential divider comprises a first resistor coupled between a supply voltage terminal and said second electrode of said capacitor and includes a series combination of a second resistor and a diode coupled between said second electrode of said capacitor and a point of reference potential; and
   said breakdown device is coupled in parallel with said second resistor.

4. Video display apparatus as recited in claim 1 further comprising:
a supply voltage terminal coupled to a supply voltage input of said potential divider and coupled to a supply voltage input of said cascode amplifier; and
a capacitor coupled between said output of said potential divider and a source of reference potential.

5. Video display apparatus, comprising:
a kinescope having a cathode coupled to an output of a cascode driver amplifier for receiving a video signal to be displayed and having a control grid for receiving a grid bias voltage;
a scan loss protection circuit comprising:
an input terminal for receiving a scan loss signal;
a capacitor having a first plate coupled to said input terminal and having a second plate coupled to said grid.
a first resistor coupled between a source of supply voltage and said second plate of said capacitor;
a second resistor coupled between said second plate of said capacitor and a source of ground reference potential; and
a Zener diode connected in parallel with said second resistor;
said protection circuit further includes an input transistor having a control electrode for initially receiving said scan loss signal and having a conduction path coupled between said input terminal and said source of ground reference potential for clamping said first plate of said capacitor to said source of ground reference potential in response to the presence of said scan loss signal; and
a diode connected in parallel with said capacitor and poled in a sense to limit the maximum positive voltage at said second plate and at said control grid of said kinescope to substantially ground reference potential when said scan loss signal is present for a period of time that is long relative to a time constant associated with said capacitor.

6. Video display apparatus as recited in claim 5 wherein said resistors and said source of supply voltage are selected to provide a grid bias voltage for said kinescope of a predetermined value relative to a minimum output voltage produced by said cascode amplifier during normal operation of said video display apparatus and said Zener diode is selected to provide a threshold voltage that is greater than said predetermined value of grid bias voltage and less than said minimum output voltage of said cascode amplifier.

7. Video display apparatus as recited in claim 5 further comprising another diode connected in series with the parallel combination of said second resistor and said Zener diode.

8. Video display apparatus, comprising:
a kinescope having a cathode coupled to an output of a video amplifier and having a control grid coupled to an output of a protection network of a type including a capacitor having a first plate coupled to a source of scan loss signal and having a second plate coupled to said control grid for applying a negative bias thereto in response to said scan loss indicating signal, and wherein:
said amplifier is of a cascode type having a predetermined minimum positive output voltage with respect to ground potential;
said network having a first operating mode in the absence of said scan loss signal for providing a positive bias potential to said control grid of a given value related to said minimum output voltage of said amplifier;
said network having a second operating mode responsive to initiation of said scan loss signal for applying said negative bias to said grid and for concurrently providing a relatively high impendance discharge path for said capacitor from a source of constant supply voltage;
said network having a third operating mode responsive to termination of said scan loss signal for concurrently providing a charging path for said capacitor and for temporarily limiting the positive bias applied to said control grid to a value higher than said given value during at a portion of the time said capacitor is charged by current flow through said charging path; said network further comprising:
an input transistor responsive to the presence of said scan loss signal for clamping said first plate of said capacitor to a point of ground reference potential; and
a diode connected in parallel with said capacitor and poled in a sense to limit the maximum positive voltage at said second plate and at said control grid to substantially ground potential during said second operating mode when said scan loss signal is present for a period of time that is long relative to a time constant associated with said capacitor.

9. Apparatus as recited in claim 8 wherein said bias network includes
a potential divider for determining said positive bias potential; and
said potential divider is coupled to a source of supply voltage in common with said cascode amplifier.

10. Apparatus as recited in claim 8 wherein:
said network includes a normally non-conductive breakdown device having a threshold of conduction greater than said positive bias potential applied to said control grid and less than said minimum predetermined positive output voltage applied to said cathode of said kinescope.

11. Apparatus as recited in claim 8 wherein:said network comprises:
a potential divider responsive in said first operating mode for producing said positive bias potential in proportion to a supply voltage applied to said cascode amplifier; and
a break-down diode connected in parallel with a selected leg of said potential divider and having a breakdown voltage greater than said positive bias potential produced by said potential divider and less than said minimum positive output voltage produced by said cascode amplifier.

12. Apparatus as recited in claim 8 wherein said network comprises:
a first resistor coupled between said output of said network and a source of supply voltage;
a diode coupled between said output of said network and a circuit node;
a second resistor coupled between said circuit node and a ground reference potential point; and
a threshold conduction device connected in parallel with said second resistor.

13. Apparatus as recited in claim 8 wherein
said source of supply voltage is shared in common with said cascode amplifier and
said threshold conduction device has a threshold greater than said first value of said positive bias potential.

14. Apparatus as recited in claim 8 wherein:

said network includes a potential divider coupled to a supply terminal of said cascode amplifier for developing said positive grid bias potential; and further comprising:

a filter coupled to an output of said potential divider for filtering residual video signals which may be produced at said supply terminal of said amplifier.

* * * * *